March 16, 1954  O. H. SCHMITT  2,671,970
FLIGHT TRAINER
Filed Oct. 21, 1944
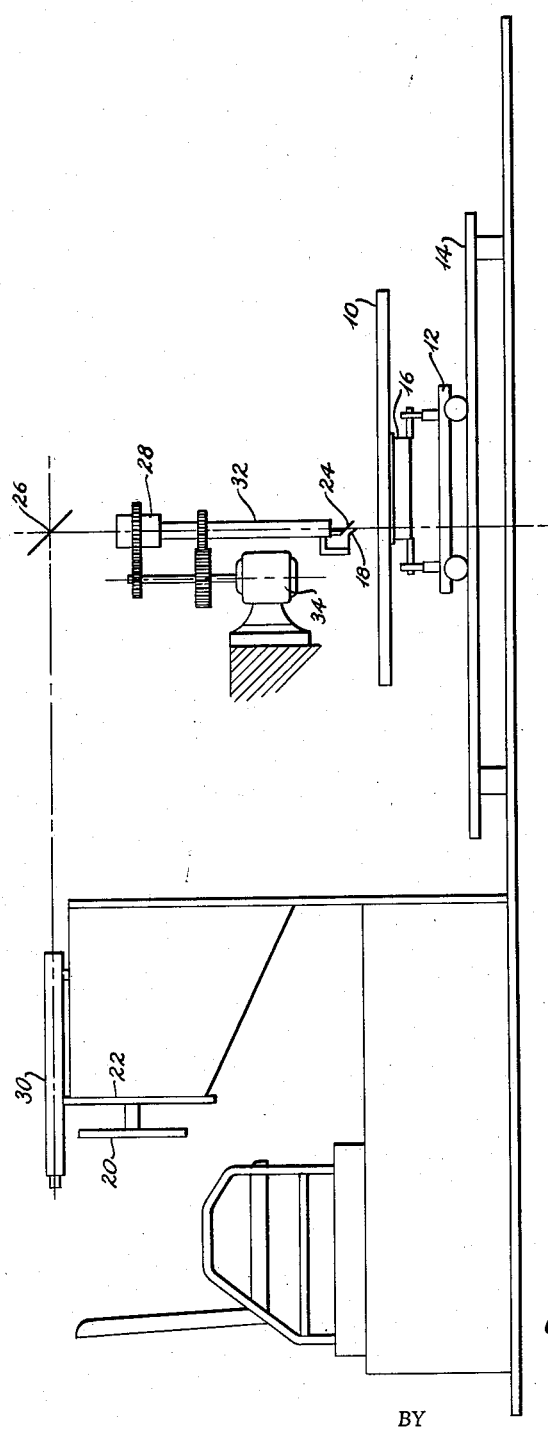
INVENTOR
Otto H. Schmitt
BY
F. J. Schmitt
Walter S. Paul
ATTORNEYS Patented Mar. 16, 1954

2,671,970

UNITED STATES PATENT OFFICE 2,671,970

FLIGHT TRAINER

Otto H. Schmitt, Port Washington, N. Y., assignor to the United States of America as represented by the Secretary of the Navy Application October 21, 1944, Serial No. 559,784

5 Claims. (Cl. 35—10.2)

This invention relates to training systems, and more particularly to systems in which the motion of an aircraft in respect to an ocean or terrestrial area is reproduced at a reduced scale for training purposes.

With the advent of relatively complicated navigational and tactical aircraft instruments, pilots have been required to undergo considerable instrument training as a part of their flight training. In addition to actual flight training procedures, the use of various training devices has been found advantageous. Such training devices permit intensified instrument training without the cost or risk of training in actual aircraft. Most of these training devices include a model aircraft and simulated controls by means of which the model may be maneuvered from a trainee's station. The instruments in connection with which training is to be given are simulated, and means are arranged to provide proper instrument indications in accordance with the maneuvers of the model aircraft.

In systems of this type, it is usual to provide a scale model terrestrial or ocean area over which a model aircraft moves, the location of the model area in respect to the trainee's station being such that the trainee may observe the motion of the model aircraft in respect thereto as desired. This general arrangement is not entirely satisfactory for training purposes, however, due to the fact that the trainee may see not only those portions of the maneuver area that he could see from an actual aircraft under similar circumstances, but also the aircraft and its position in relation to the entire maneuver area. It is desirable, therefore, to provide means whereby the trainee is effectively placed in the model aircraft so far as his view of the maneuver area is concerned.

Accordingly, there is provided in a training system a trainee's station, an index representing a model aircraft, a model maneuver area translatable in respect to the index, simulated aircraft controls at the trainee's station for causing motion of the maneuver area in respect to the index to simulate the motion of an area as seen from an aircraft flying thereabove, and an optical viewing system permitting the trainee to view the area from the location of the index, the direction of sight being determined by the heading of the aircraft introduced by the simulated controls.

For a better understanding of the invention, reference is made to the accompanying drawing, the single figure of which is a schematic view of a training system in accordance therewith.

Essentially the training system comprises a scale model aircraft and maneuver area, a trainee's station adjacent thereto, and means whereby the trainee is in effect placed in the model aircraft. Referring to the drawing, a model maneuver area 10 which may be a scale model of terrestrial or ocean area is mounted for motion in a horizontal plane on a translation system, this system comprising a carriage 12 arranged for motion along parallel tracks 14 and a trolley 16 supporting the model maneuver area and arranged for translation across carriage 12 in directions normal to the direction of motion of that carriage. An index 18 fixedly mounted above the translation system represents the position of an aircraft in respect to the model maneuver area, it being understood that moving the model maneuver area in respect to the fixed model aircraft is equivalent to moving the model aircraft in respect to a stationary model of the maneuver area.

Control means indicated schematically at 20 at the trainee's position are provided for causing relative motion of the model aircraft and the maneuver area. Conveniently, control means 20 may operate a control system of the general type disclosed in copending application Serial No. 543,592, filed July 5, 1944, Control System, Otto H. Schmitt, this system comprising means in combination with a bidirectional translation system whereby an object mounted on the translation system may be caused to describe any path in the translation plane in response to operation of a single control member. Additional controls may be added as desired, it being understood that the only requirements are that the model maneuver area move in respect to the index in such fashion that the motion of a maneuver area beneath an actual aircraft as seen from the aircraft is simulated.

A complement of simulated flight instruments is mounted on instrument panel 22 of the trainee's station and the specialized instruments in connection with which training is to be given are also simulated at this location. Suitable means are provided whereby motion of the model maneuver area 10 in respect to index 18 causes suitable indications by each of the simulated instruments.

An optical viewing system is provided whereby the trainee is in effect placed in the model aircraft, this system being so arranged that the trainee may view the model maneuver area as though from the location of index 18, the direction of sight being determined by the heading of the aircraft in respect to the maneuver area introduced by simulated controls 20. The optical viewing system comprises a panoramic periscope including lower mirror 24, upper mirror 26, an erecting device 28, and suitable collimating telescopes 30 and 32 whereby distortions introduced in the periscope are eliminated and a real image produced. Conveniently, the erecting device may be the well-known Dove prism which, when rotated at half the angular velocity of the lower mirror of the periscope, maintains the image erect at all times.

Motor 34 is fixedly mounted and arranged to rotate the lower mirror of the panoramic periscope together with index 18 in accordance with the heading of the model aircraft in respect to the maneuver area. Suitable gearing also connects motor 34 to the Dove prism assembly and rotates it at the proper angular velocity and in the proper direction always to maintain the desired erect image at the eye-piece of the optical system. Thus, it will be evident that the trainee using the optical system may observe the model maneuver area as though he were actually in the model aircraft. Accordingly, his view is normally restricted to the field ahead of the aircraft, objects in the maneuver area passing from his field of vision as the aircraft flies thereover.

Additional refinements may be added to the system to simulate banking of an aircraft in turns and pitching thereof in dives or climbs. Thus banking of the aircraft may be simulated by causing the erecting prism drive to lag or lead the scanning drive of the lower mirror of the periscope. This effectively causes the maneuver area as seen through the optical system to tilt realistically. Pitching may be simulated by rotating the upper mirror through a small angle about a horizontal axis normal to the optic axes of the two collimating telescopes shifting the scene slightly upwardly or downwardly as viewed through the telescope 30. In addition, auxiliary means may be provided whereby the trainee may scan the model maneuver area while the heading of the model aircraft is maintained constant. For this purpose, means may be provided for rotating the panoramic periscope without affecting the motion of the maneuver area beneath the index representing the model aircraft.

It will be recognized that the system of the invention possesses certain advantages not realizable in previous trainers in which the model aircraft was moved in respect to a model maneuver area. Thus, for example, objects representing bombs and flares or the like may be dropped from the location of the index upon the maneuver area to simulate actual bombing or other tactical procedures. This advantage stems from the fact that the index representing the model aircraft is fixed and any necessary equipment can be mounted adjacent thereto without adding undue complication to the system.

While the instrument trainer of the invention is of general application, it is of particular advantage when used as a part of the training system disclosed in copending application Serial No. 548,487, filed August 7, 1944, Training System, Otto H. Schmitt. In the training system of this copending application, a model aircraft and a model submarine are provided and each is arranged to maneuver in respect to a model ocean area in response to individual sets of controls. Means are provided for simulating a detectable characteristic of the submarine and the model aircraft is provided with simulated detection equipment.

In order that training in the use of detection equipment may be carried out under realistic conditions, the pilot trainee is not allowed to view the models but is given information as to the position of the aircraft model in respect to the ocean area by means of a servo-indicating system which reproduces the motion of the model aircraft at a greatly reduced scale.

It will be recognized that the flight trainer of the invention may conveniently be used as the servo-indicating system of the training system disclosed in the copending application, the controls for the model aircraft of that system being arranged also to operate the translation system normally operated by controls 20 of the flight trainer of the invention.

What is claimed is:

1. In a training system, a permanently fixed trainee's station, an index representing a model aircraft, a model maneuver area translatable with two coplanar directions perpendicular to each other and in respect to the index, simulated aircraft controls at the trainee's station for causing motion of the maneuver area with respect to the index and for correspondingly changing the heading of the index to simulate the motion of the area as seen from an aircraft flying thereabove, and an optical system permitting the trainee to sight the maneuver area from the location of the index, the direction of sight being determined by the heading of the aircraft introduced by the simulated controls.

2. In a training system, a stationary trainee's station, an index representing an aircraft positioned remote from said station, said index being fixed against linear motion, a model maneuver area horizontally translatable with respect to said index, simulated aircraft controls at said station for causing horizontal motion of said area and coplanar rotary motion of said index to simulate the motion of an area as seen from an aircraft flying thereabove, and an optical viewing system including a rotary telescope to which the index is fixed permitting the trainee to view said maneuver area from the location of said index, the direction of sight being determined by the heading of the aircraft introduced by said controls.

3. In a training apparatus, a model maneuver area translatable in a single plane in mutually normal directions, an optical viewing system for observing said area, said system comprising a periscope including a telescope mounted for rotation about an axis perpendicular to the plane in which said area is translatable, means secured to said telescope at the outer end thereof to direct vision in a predetermined single direction toward said area, an index simulating an aircraft secured to said telescope for rotation therewith in order to shift the heading of said aircraft with respect to said area in response to rotation of the telescope, said aircraft being disposed between said means and said area, a stationary trainee's station, and simulated aircraft controls located at said station for controlling the movement of said area and the rotation of said telescope so that the direction of sight on said area is restricted to sight which is coincident with the heading of said aircraft.

4. The training apparatus of claim 3 and said periscope also including an optical erecting device operatively connected with said simulated aircraft controls, a second telescope, and said optical erecting device being in the vision line between the first-mentioned and said second telescope.

5. A training apparatus consisting of a model maneuver area translatable in a single plane, a stationary trainee's station located remotely of said area, a periscope including an eye piece at said station, a first telescope to which said eye piece is connected, a second telescope having its outer end arranged for vision of said area, an optical erecting device interposed in the line of vision between said telescopes, said second telescope having at least a portion thereof rotatable about an axis perpendicular to said single plane and provided with a light deflecting member which is spaced slightly from said area, an index simulating an aircraft and located between said member and said area, said aircraft simulating index being secured to the rotatable portion of said second telescope so that said index is rotated with said second telescope in order to change the heading of said aircraft forming index, said index and light deflecting member being fixed with respect to each other and movable only as a unit so that a definite vision relationship between the index and deflected light from said area is always maintained, and control means at said station for displacing said area and for rotating said second telescope so that the trainee's line of vision is maintained in coincidence with the heading of the aircraft simulating index.

OTTO H. SCHMITT.

References Cited in the file of this patent

UNITED STATES PATENTS

| Number | Name | Date |
| --- | --- | --- |
| 2,271,296 | Hargrave | Jan. 27, 1942 |
| 2,298,305 | Muller | Oct. 13, 1942 |
| 2,313,480 | Reid | Mar. 9, 1943 |
| 2,314,497 | Hargrave | Mar. 23, 1943 |
| 2,326,764 | Crane | Aug. 17, 1943 |
| 2,352,101 | Hutter | June 20, 1944 |
| 2,366,603 | Dehmel | Jan. 2, 1945 |
| 2,385,095 | McCarthy | Sept. 18, 1945 |
| 2,385,291 | Link | Sept. 18, 1945 |
| 2,406,751 | Emerson | Sept. 3, 1946 |
| 2,442,297 | Link | May 25, 1948 |
| 2,443,604 | Dehmel | June 22, 1948 |

FOREIGN PATENTS

| Number | Country | Date |
| --- | --- | --- |
| 548,093 | Great Britain | 1942 |